(12) United States Patent
Vila Casado et al.

(10) Patent No.: US 11,494,613 B2
(45) Date of Patent: Nov. 8, 2022

(54) FUSING OUTPUT OF ARTIFICIAL INTELLIGENCE NETWORKS

(71) Applicant: The Aerospace Corporation, El Segundo, CA (US)

(72) Inventors: Andres Vila Casado, Culver City, CA (US); Donna Branchevsky, Los Angeles, CA (US); Kyle Logue, Westchester, CA (US); Esteban Valles, Los Angeles, CA (US); Sebastian Olsen, Culver City, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 982 days.

(21) Appl. No.: 16/238,242

(22) Filed: Jan. 2, 2019

(65) Prior Publication Data
US 2020/0210810 A1    Jul. 2, 2020

(51) Int. Cl.
*G06N 3/04* (2006.01)
*G06N 3/08* (2006.01)
*G06V 30/194* (2022.01)
*G06V 10/82* (2022.01)
*G06K 9/62* (2022.01)

(52) U.S. Cl.
CPC ......... *G06N 3/0454* (2013.01); *G06K 9/6262* (2013.01); *G06N 3/08* (2013.01); *G06N 3/082* (2013.01); *G06V 10/82* (2022.01); *G06V 30/194* (2022.01)

(58) Field of Classification Search
CPC ........ G06N 3/0454; G06N 3/082; G06N 3/08; G06V 30/194; G06V 10/82; G06K 9/6262

USPC .......................................................... 706/20
See application file for complete search history.

(56) References Cited

U.S. PATENT DOCUMENTS

| | | | | |
|---|---|---|---|---|
| 2018/0122403 | A1* | 5/2018 | Koretzky | G10L 21/028 |
| 2019/0073590 | A1* | 3/2019 | Wu | G06F 9/00 |

FOREIGN PATENT DOCUMENTS

| | | | | |
|---|---|---|---|---|
| CN | 107544518 | A * | 1/2018 | |
| CN | 107884475 | A * | 4/2018 | G01N 29/045 |
| CN | 108475057 | A * | 8/2018 | B60W 30/0956 |

OTHER PUBLICATIONS

Ayan Das, Quora Article, "How do I merge two separately trained neural networks into one in Python (deep CNN & RNN for image classification)?" available at https://www.quora.com/How-do-I-merge-two-separately-trained-neural-networks-into-one-in-Python-deep-CNN-RNN-for-image-classification (last accessed Jan. 2, 2019).
Dario Stojanovski et al., "Finki at SemEval-2016 Task 4: Deep Learning Architecture for Twitter Sentiment Analysis," Proceedings of SemEval 2016, San Diego, California, pp. 154-159 (Jun. 16-17, 2016).

(Continued)

*Primary Examiner* — Mahmoud Gimie
(74) *Attorney, Agent, or Firm* — LeonardPatel PC

(57) ABSTRACT

Fusion of trained artificial intelligence (AI) neural networks to produce more accurate classifications is disclosed. Concatenation from each network being merged may be performed. The new set of features, which includes the concatenated layers, is then fed through a new classifier to form a single final classifier that uses the best parts of each input classifier.

43 Claims, 6 Drawing Sheets

(56) References Cited

OTHER PUBLICATIONS

Duona Zhang et al., "Automatic Modulation Classification Based on Deep Learning for Unmanned Aerial Vehicles," Sensors 18, 924 (2018).

Duona Zhang et al., "Heterogeneous Deep Model Fusion for Automatic Modulation Classification," available at https://www.preprints.org/manuscript/201801.0097/v1/download (last accessed Jan. 2, 2019).

Jianxun Lian et al., "xDeepFM: Combining Explicit and Implicit Feature Interactions for Recommender Systems," KDD '18, London, United Kingdom (Aug. 19-23, 2018).

Shang-Liang Chen et al., "Data Fusion Neural Network for Tool Condition Monitoring in CNC Milling Machining", International Journal of Machine Tools & Manufacture, 40 (2000), pp. 381-400.

\* cited by examiner

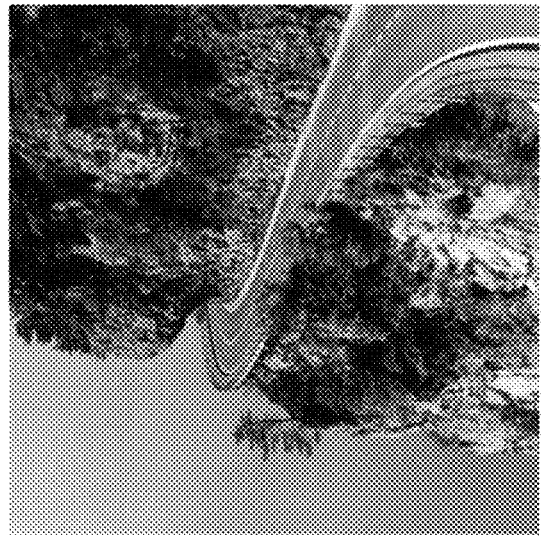
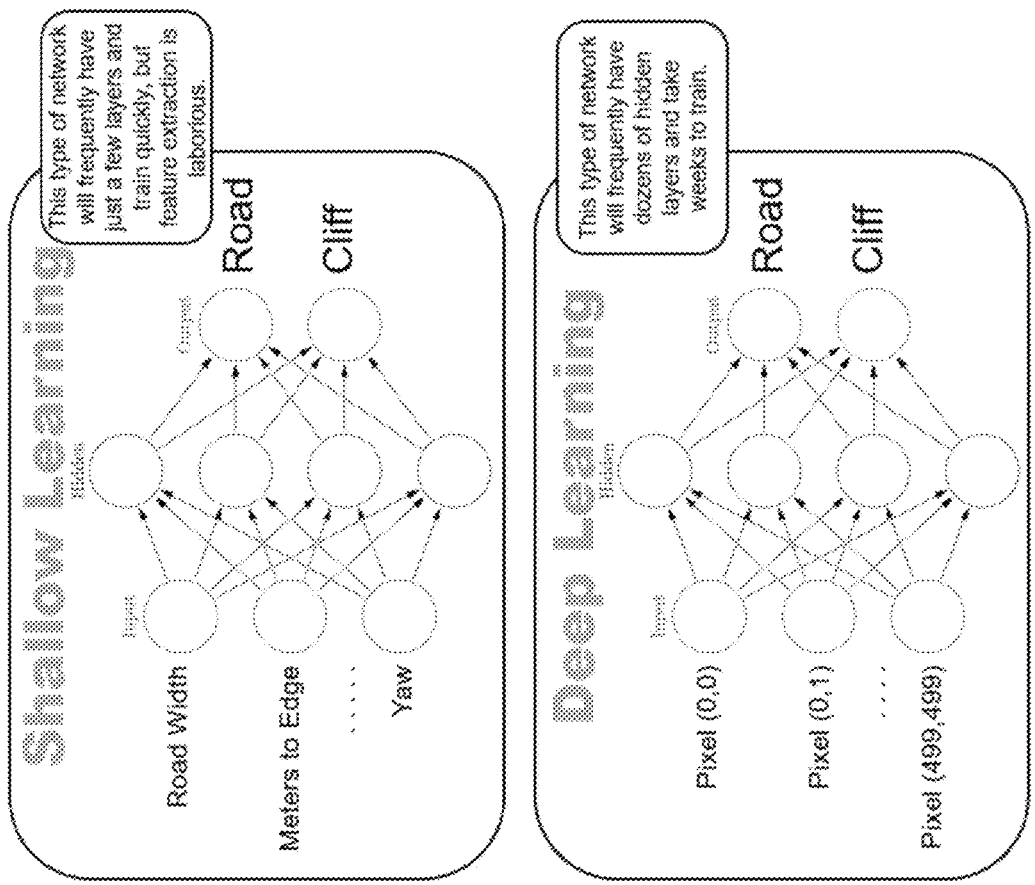
FIG. 1

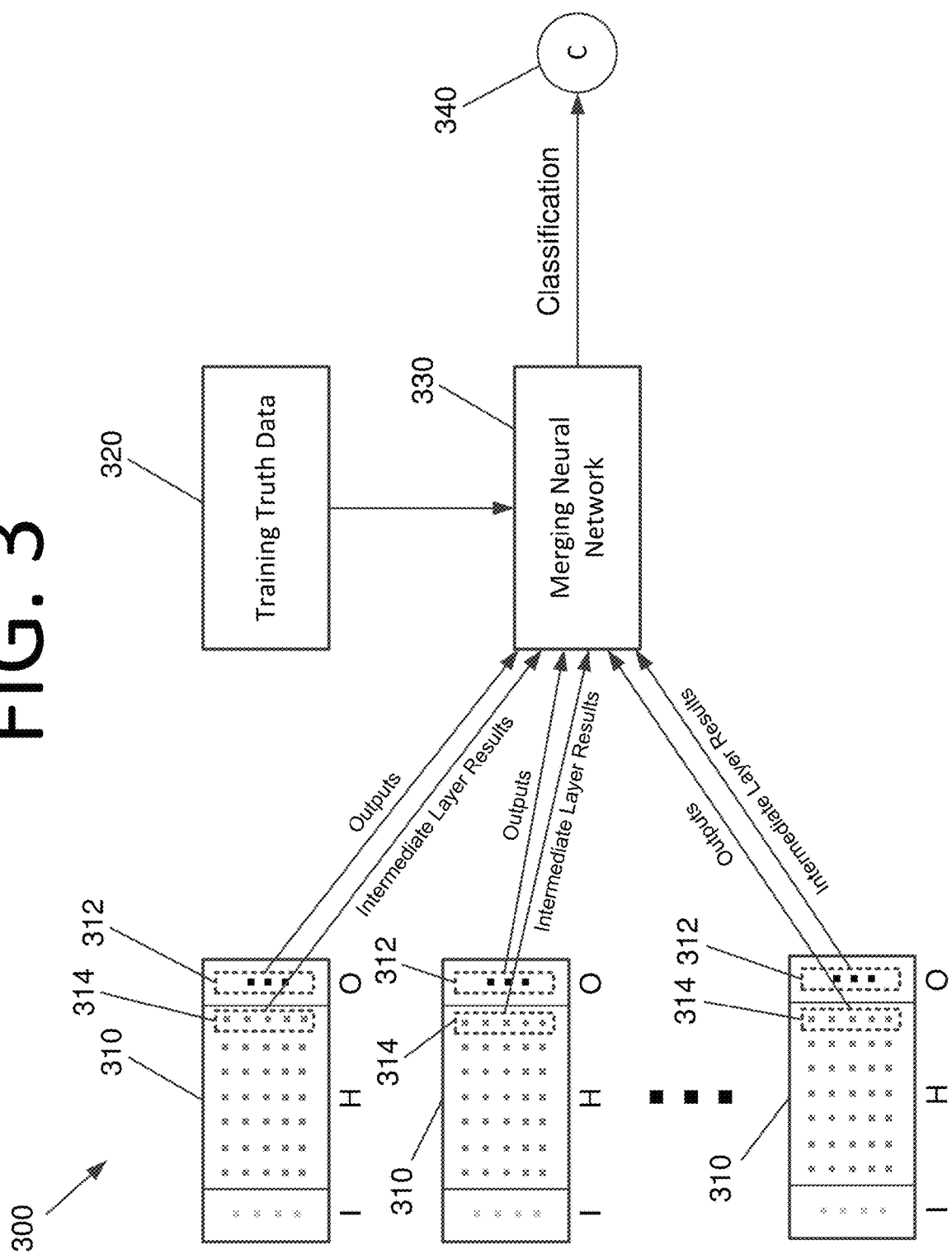

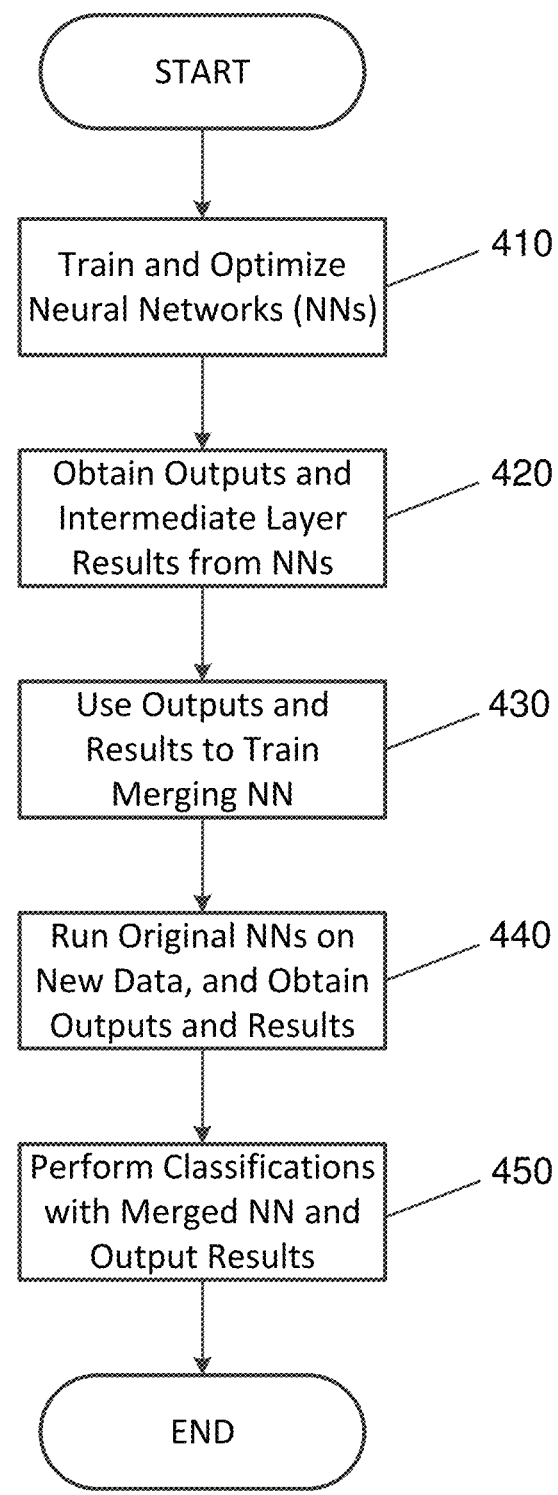

FUSING OUTPUT OF ARTIFICIAL INTELLIGENCE NETWORKS

FIELD

The present invention generally relates to artificial intelligence (AI), and more particularly, to fusion of trained AI neural networks to produce more accurate classifications where intermediate (hidden) layer results are also used.

BACKGROUND

Generally, a classification problem will have a number of samples X that have a known integer label from 1 to Y. Often, a subset of the samples is isolated (i.e., a cross validation set) and various classification techniques are applied to the remaining portion (i.e., a training set). In the case of neural networks, the input samples can be fed without modification into a set of layers of neurons, typically using greater than ten layers. This is known as a deep learning neural network (DLNN). An alternative approach is to create some "expert features" from the raw samples and then feed those features through as few as one or two layer(s), but typically fewer than a DLNN. This is known as a shallow learning neural network (SLNN). For both approaches, the layers are all trained simultaneously on the training set, continuously checking for overfitting on the isolated cross-validation set. Both techniques can yield excellent results, and there is considerable enthusiasm for both approaches. The optimal size, shape, and quantity of individual layers varies depending on the problem that is addressed by the respective neural network.

FIG. 1 illustrates an autonomous vehicle example 100 of shallow learning and deep learning to make a binary classification of image areas containing a road or a cliff. Per the above, a SLNN will frequently have only a few layers and train relatively quickly. In this example, the inputs include road width, meters to the edge, yaw, etc. There is a single input layer and a single output layer. Multiple hidden layers may be used, but typically fewer than a DLNN. Features may be developed more-or-less independently of one another, but feature extraction is laborious, and typically requires expert knowledge of the field under study.

A DLNN often has many layers (e.g., 10, 50, 200, etc.) and subsequent layers typically reuse features from previous layers to compute more complex, general functions. In this example, pixels from an image are provided as the input layer. Due in part to the relatively large number of hidden layers, this type of neural network is typically far more complex than a SLNN and often takes days or weeks to train.

Both DLNNs and SLNNs are useful tools. However, a problem with both DLNNs and SLNNs is merging the outputs of these networks with other approaches to form a "fused" classifier. For instance, it may be desirable to combine several independent DLNNs, two relatively simple SLNNs, or any combination of neural networks, including both DLNNs and SLNNs. Conventional approaches only use output layers of neural networks for fusion purposes. Accordingly, an improved approach to neural network fusion may be beneficial.

SUMMARY

Certain embodiments of the present invention may provide solutions to the problems and needs in the art that have not yet been fully identified, appreciated, or solved by conventional AI technologies. For example, some embodiments pertain to fusion of trained AI neural networks to produce more accurate classifications where intermediate (hidden) layer results are also used.

In an embodiment, a computing system includes memory storing computer program instructions for fusing a plurality trained original neural networks and performing classifications and at least one processor configured to execute the computer program instructions. The computing system is configured to receive output layer results and results from at least one hidden layer from each of a plurality of trained original neural networks. The computing system is also configured to perform classifications via the merging neural network based on the received output layer results and the results from the at least one hidden layer from each of the plurality of trained original neural networks and output results of the classifications.

In another embodiment, a computer program is embodied on a non-transitory computer-readable medium. The program is configured to cause at least one processor to perform classifications based on output layer results and results from at least one hidden layer from each of a plurality of trained original neural networks. The program is also configured to cause the at least one processor to output results of the classifications.

In yet another embodiment, a computer-implemented method includes receiving, by a computing system, training truth data used in part to train a plurality of trained original neural networks. The computer-implemented method also includes receiving, by the computing system, output layer results and results from at least one hidden layer from each of a plurality of trained original neural networks for training data used in part to train the original neural networks. The computer-implemented method further includes training and optimizing a merging neural network, by the computing system, using the received training truth data and the received output layer results and results from at least one hidden layer from each of the plurality of trained original neural networks for the training data used in part to train the original neural networks. Additionally, the computer-implemented method includes receiving, by the computing system, output layer results and results from at least one hidden layer from each of a plurality of trained original neural networks for new data, and performing classifications via the merging neural network, by the computing system, based on the output layer results and the results from the at least one hidden layer from each of the plurality of trained original neural networks for the new data. The computer-implemented method also includes outputting results of the classification, by the computing system.

In still another embodiment, a computer-implemented method includes performing classifications via a merging neural network, by a computing system, based on output layer results and the results from at least one hidden layer from each of a plurality of trained original neural networks for new data not used to train the merging neural network or the plurality of trained original neural networks. The computer-implemented method also includes outputting results of the classification, by the computing system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 illustrates an autonomous vehicle example of shallow learning and deep learning.

FIG. 3 is an architectural diagram illustrating a classifier that merges output and intermediate layer results from multiple neural networks, according to an embodiment of the present invention.

FIG. 4 is a flowchart illustrating a process for fusing trained AI networks to produce more accurate classifications, according to an embodiment of the present invention.

DETAILED DESCRIPTION OF THE EMBODIMENTS

Figure 2A:
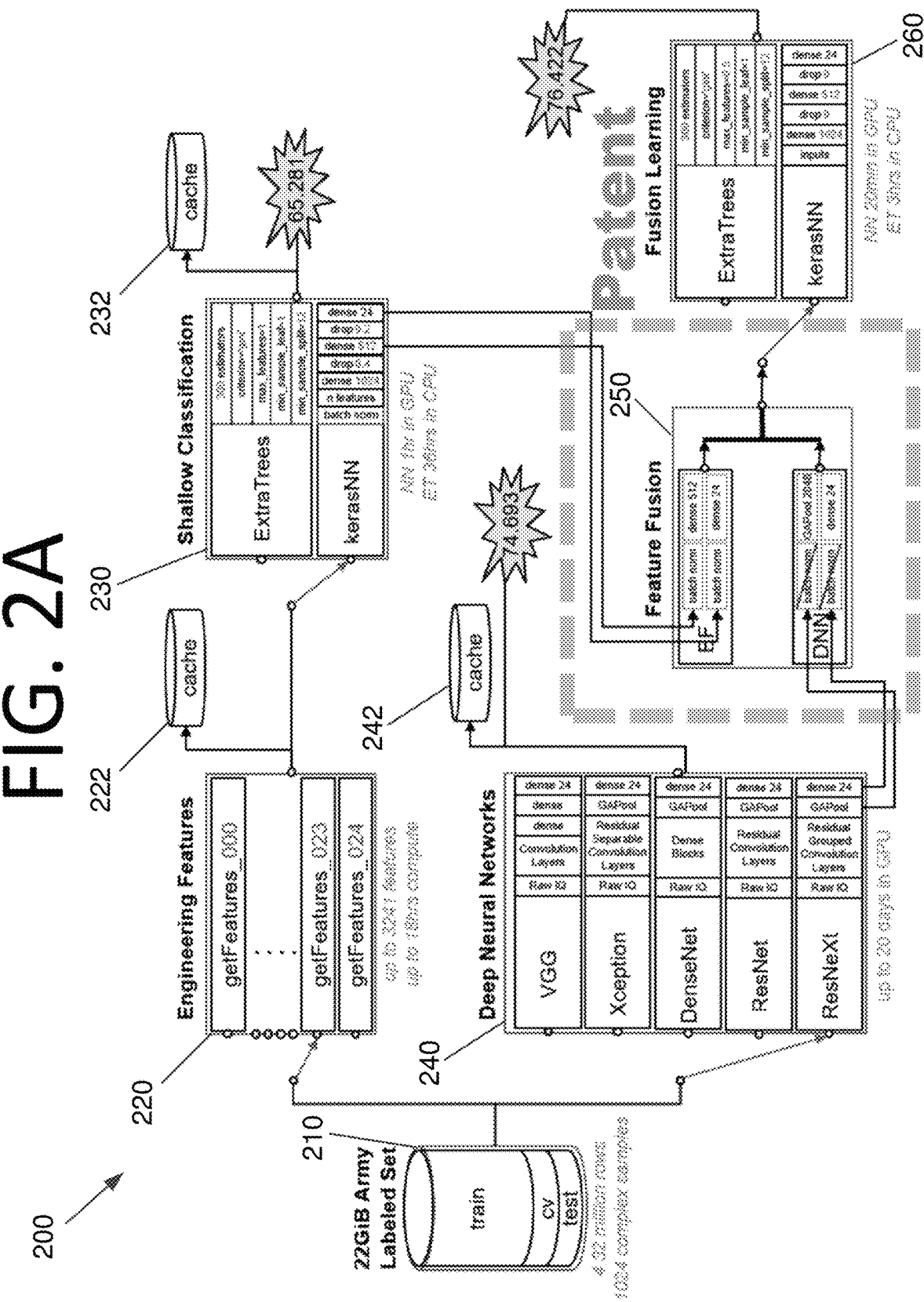
FIG. 2A is an architectural diagram illustrating an example of a classifier that performs fusion learning on layers from a DLNN and a SLNN that was employed for the U.S. Army Rapid Capabilities Office (RCO) Signal Classification Challenge, according to an embodiment of the present invention.

Some embodiments of the present invention pertain to fusion of trained AI neural networks to produce more accurate classifications where intermediate (hidden) layer results are also used. In some embodiments, it is assumed that the original neural networks have already been trained. In order to train the merging neural network, prediction/classification may be run on all training data for all original neural networks in order to obtain the hidden and output layer results for that training data. Those hidden and output layer results may then be used for the training data and the training truth data to train a merging network. In the prediction/classification step, the prediction step may first be run on the original neural networks for the "new" data (i.e., the data we on which prediction is to be performed), obtain the hidden and output results, and use those results as the inputs into the prediction step of the already trained merging (i.e., fusion) neural network in order to obtain a final prediction.

In some embodiments, results from each network being merged are concatenated. For instance, the final output layer of a DLNN of size Y may be merged with at least one antecedent intermediate (i.e., hidden) layer having an arbitrary size that may be much larger than Y. Normalization techniques, such as "batch normalization," may then be performed prior to concatenating the output of one or more SLNNs. Normalization is a process by which input is adjusted and scaled so that all variables have similar ranges. Batch normalization adjusts the variables to have a mean of 0 and a variance of 1. In some embodiments, normalization is only applied to SLNN layers since the DLNN layers are already the outputs of multiple batch-normalized layers. That new set of features, which includes the concatenated layers described above, is then fed through a new classifier to form a single final classifier that uses the best parts of each input classifier. In this context, concatenation means that output and some intermediate nodes from the original neural networks (e.g., SLNNs and DLNNs) become a single flat layer of neurons by appending them one after the other. For example, concatenating an output layer of size Y with the results of an intermediate hidden layer of size X will result in a flat layer of neurons of size X+Y.

Per the above, conventional approaches only use output layers of neural networks for "fusion" purposes. These approaches lose the intermediate layers trained during the initial classification process that often retain valuable neurons capable of significant increases in classification accuracy due to their inclusion of information about features in the raw data. Some embodiments use one or more of these intermediate layers to fuse neural network output by concatenating output layers and intermediate hidden layer results in a secondary machine learning process, increasing the accuracy of the classification. Indeed, this increase in classification accuracy may come with little additional computing cost.

The information in the hidden layers and output layers of both SLNNs and DLNNs has already been trained to be information that is useful for the classification process. Training the fusion network (i.e., a merging neutral network) of some embodiments is much faster than training SLNNs and DLNNs because the fusion network does not have to build or select useful features. Rather, the fusion network learns how to use the features effectively. In other words, fusion networks start with processed features that were created for the classification process instead of starting from raw data (e.g., DLNNs) or plain expert engineered features (e.g., SLNNs).

The fusion approach of some embodiments may be employed to combine any number of neural networks of any type(s) without deviating from the scope of the invention. For instance, three DLNNs may be combined, four SLNNs may be combined, one DLNN and one SLNN may be combined, etc. Embodiments are also not limited to the type of deep and/or shallow learning neural networks. For instance, Siamese neural networks, recurrent neural networks, etc. could be used. Indeed, any type of currently existing or after-arising neural network may be used in some embodiments without deviating from the scope of the invention. In order to increase classification accuracy, the neural networks that are to be fused should generally have different architectures and/or inputs from one another. In other words, fusing neural networks with similar architectures trained on the same data or type of data is unlikely to increase accuracy.

In an example implementation for the U.S. Army RCO Signal Classification Challenge, a team from The Aerospace Corporation® took the labeled input signals and pursued two approaches: (1) a DLNN (ResNeXt) using a raw input signal with over 50 layers ending with a 2048 neuron layer and a 24 neuron layer; and (2) a SLNN (kerasNN) using over 3000 expert engineered features as the input layer, two dense hidden layers with 1024 and 512 neurons, and a dense output layer of 24 neuron layers. The size of 24 output layers was selected because the challenge required classification of 24 different signals. An additional neural network was then trained with a concatenation (deep 2048, deep 24, regularized shallow 512, and regularized shallow 24) as the input to yield better performance than either approach alone.

An architectural diagram of a classifier 200 that was used to win the U.S. Army RCO Signal Classification Challenge is shown in FIG. 2A. A 22 GB labeled dataset 210 was used as the input for both engineered features 220 and DLNNs 240. While there is more than one DLNN in DLNNs 240, only one, ResNeXt 241, was used for the merging process in this example since there were not significant enough differences between ResNeXt 241 and the other DLNNs to provide much value in merging in the others. Multiple neural net models are trained independently, such that the implemented embodiment can take advantage of model diversity, feature diversity, and team diversity. Model diversity comes from having different neural network architectures, feature diversity comes from having different types of inputs into the network (raw and expert engineered), and team diversity comes from having diverse teams that can optimize the different classifiers/networks in parallel. DLNNs 240 are trained based on raw data from labeled dataset 210, while shallow classifiers 230 are trained based on expert engineered features 220. While two shallow classifiers 230 were trained, only one SLNN, kerasNN 231, is a neural network. The ExtraTrees classifier was not used in this example.

Expert engineered features are a large set of known statistics and computations that have been shown to be useful when trying to classify signals. For this example, these features included noise estimations, Fast Fourier Transforms (FFTs), cross-correlations among many other known statistics, etc. These features are computed directly from the raw data. These engineering features are the input to shallow classifiers 230. On the other hand, DLNNs 240 use the raw data as input.

The results of the output layer and the next to last layer (i.e., the last hidden layer) of kerasNN 231 are batch normalized and concatenated to the results of the output layer and the next to last layer (i.e., the last hidden layer) of ResNeXt 241, as shown in feature fusion 250. This concatenation serves as the input of the merging neural network (i.e., fusion classifier 260). The different cache blocks 242, 222, 232 serve to store data so that all of the data does not need to be run again when optimizing parameters downstream.

As can be seen, the accuracy score of shallow classifiers 230 alone was 65.281 (a score of 100 indicates not only 100% accurate estimation, but also 100% certainty). Accuracy scores are computed based on the probabilities the final classifier assigns that each of the test data observations correspond to the 24 possible signals. The scoring function is 100/(1+logloss), with:

$$logloss = -\frac{1}{N}\sum_{i=1}^{N}\sum_{j=1}^{M} y_{ij} \log p_{ij} \quad (1)$$

where N is the number of instances in the test set, M is the number of modulation class labels (M=24 here), log is the natural logarithm, $y_{ij}$ is 1 if test instance i belongs to class j and 0 otherwise, and $p_{ij}$ is the classifier-predicted probability that observation i belongs to class j.

The accuracy score of DLNNs 240 was 74.693. However, the accuracy score of fusion learning classifier 260 after feature fusion 250 was 76.422, which was better than SLNNs 230 or DLNNs 240 alone.

Figure 2B:
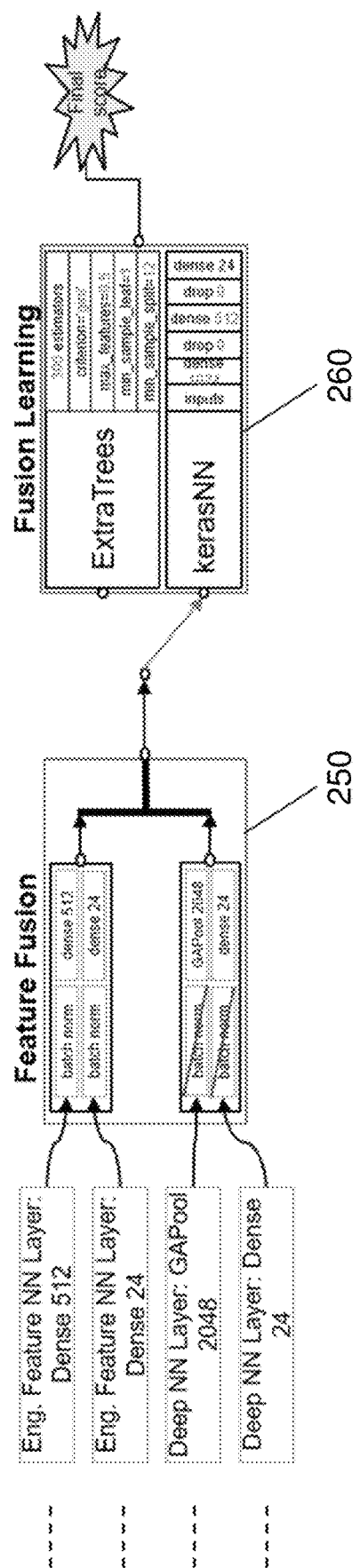
FIG. 2B is an enlarged portion of FIG. 2A that shows feature fusion and a fusion learning classifier, according to an embodiment of the present invention.

FIG. 2B is an enlarged portion of FIG. 2A that shows feature fusion 250 and fusion learning classifier 260, according to an embodiment of the present invention. The last two neuron layers from kerasNN 231 and ResNeXt 241 are horizontally concatenated. The neural layers for kerasNN 231 are batch normalized. This input layer is connected to a first hidden dense layer with a rectified linear unit (ReLU) activation function. This first hidden layer is connected to a second hidden dense layer with a ReLU activation function. The output layer is a dense layer with a softmax activation function connected to the second hidden layer.

A dense (i.e., fully connected) layer is a linear operation in which every input is connected to every output by a weight. Thus, there are n inputs times n output weights, which can be a large number. This is typically followed by a non-linear activation function. A ReLU is a unit employing a rectifier, which is an activation function defined as the positive part of the argument:

$$f(x) = x^+ = \max(0, x) \quad (2)$$

where x is the input to a neuron. A softmax function (i.e., a normalized exponential function) is a generalization of a logistic function that squashes a K-dimensional vector of arbitrary real values into a K-dimensional vector of real values for K≥2, where each entry is the interval (0, 1), and all of the entries add up to 1.

The hidden dense net sizes in this case were consistently best with a first hidden layer size of 1024 nodes and a second hidden layer size of 512 nodes. However, these sizes may change for different applications without deviating from the scope of the invention. The number of hidden layers may also change for different applications without deviating from the scope of the invention.

The approach shown in FIGS. 2A and 2B has been demonstrated to improve the signal classification accuracy and log loss score, as seen in the signal classification challenge results and testing. The impact of merging varies depending on characteristics of the models that are merged. Merging is more beneficial when the input data into the networks to be merged is different, as well as when the networks have significantly different architectures. Throughout the competition, merging DLNNs 240 with SLNNs 230 produced an increase in accuracy over DLNN and SLNN results alone.

Multiple tests have shown that slight modifications away from the approach of some embodiments can actually cause scores to get worse/fall below the original DLNN score. These modifications include batch normalizing of DLNN layers, changing the activation function, changing dense layer sizes, training a single network that uses both the raw input and the engineering features input, combining just the softmax output of the original neural networks, and using other shallow classification techniques (e.g., logistic regressor and tree ensemble algorithms) to merge the networks.

It is not currently known why these variations make performance worse. There is a large amount of trial and error with machine learning. These were the best results, but it is believed that some parameters, such as dense layer size, batch normalization, etc., will change depending on the problem and the original neural network sizes.

Some embodiments have various advantages over conventional techniques. Accuracy may be improved, and no better approach has been found than the merging approach of some embodiments. Some other approaches that were observed have trained a single network that uses the SLNN inputs (i.e., expert engineered features) and DLNN inputs (i.e., raw data) at the same time. However, some embodiments allow for greater optimization of each individual architecture as compared to these observed approaches. In testing, optimizing the network this way was very inefficient time-wise and did not show promise to beat the original DLNN score. This time inefficiency stems from the fact that a large neural network that uses both raw data and expert engineered features will take a long time to be trained, which makes the process of choosing the best expert engineered features and parameters associated to the layers thereof slower than optimizing a SLNN.

Also, assuming that both DLNN and SLNN models are available, merging as is performed in some embodiments is very time efficient. Merging the model may take approximately 15 minutes to train in some embodiments, whereas DLNN can take days or weeks to train. Furthermore, the basis of some embodiments is that they can take advantage of the output layer result (probabilities), but also the feature values themselves.

Various applications are possible for some embodiments. For instance, some embodiments can be used to improve any machine learning classification and regression task. The split between DLNNs that use raw data and SLNNs that use expert engineered feature data is generalizable to all fields where machine learning is applied. The approach of some embodiments creates an effective way to combine both DLNNs and SLNNs. Some embodiments can increase accuracy in machine learning applications that have teams working on both DLNN and SLNN learning models. Furthermore, some embodiments can be scaled if additional neural network layers are available and found to be useful. This would likely provide an even higher increase in accuracy.

The first step in merging in some embodiments is selecting which layers from the original neural networks to merge. The results of the last dense layer (i.e., the output layer) before it goes through a softmax activation function, for example, are always chosen in some embodiments. These results are proportional to the probability that the neural network is assigning to each class. The output of the second-to-last layer is also part of the merging in some embodiments since it contains data that was removed in the operations of the output dense layer. Outputs of other layers may also be used for different applications if they are found valuable to merge. There is typically a lot of trial and error in training. More or fewer layers may be used from one application to the next if such a configuration provides better results.

The merging neural network is trained by first obtaining its input data, i.e., the outputs of the layers that will be merged for all the training data. This is obtained by running the training dataset through the already trained (original) neural networks (e.g., DLNNs and SLNNs) that will be merged and collecting the outputs of the layers that will be merged. The merging neural network can be trained using this collected input data and the training truth data that was already used to train the other neural networks (e.g., DLNNs and SLNNs). The training input and truth data essentially teach the neural networks how to perform classification correctly.

Training input data plus training truth data are necessary to train a classifier. Having both sets is what allows the machine to learn how to take input data and perform classification. This is somewhat analogous to teaching a child how to recognize cars from pictures, for example. Pictures of cars (analogous to training input data) and somebody telling the child that an object actually is a car (analogous to training truth data) are both needed in order for the child to learn how to correctly classify a picture of a car as such in the future.

The approach of some embodiments is relatively straightforward to generalize to an arbitrarily larger number of neural networks. In such embodiments, the results output layer and the second-to-last layer of all of the original neural networks could be concatenated and serve as input to the merging neural network. These layer results may or may not be batch normalized before concatenation.

FIG. 3 is an architectural diagram illustrating a classifier 300 that merges output and intermediate hidden layer results from multiple original neural networks 310, according to an embodiment of the present invention. Any desired number of different original neural networks 310 may be used without deviating from the scope of the invention. Each original neural network 310 may be of any desired type (e.g., a DLNN, a SLNN, etc.), so long as neural network 310 has intermediate hidden layers.

Each neural network 310 includes an input layer I, any desired number of intermediate hidden layers H (arbitrarily shown as 5 here; it should also be noted that in some cases, there may only be one), and an output layer O. After original neural networks 310 are trained and their parameters are optimized, outputs 312 from the output layer and results 314 from the last intermediate layer for each original neural network 310 for all of the training data and training truth data 320 are provided to merging neural network 330. Outputs 312 and results 314 for the training data, in conjunction with training truth data 320, are used to train and optimize merging neural network 330. It should be noted that "results" in this context means results from running the training data through the already trained original neural networks. Optimization may include, but is not limited to, selecting which layer(s) to merge, determining whether to batch normalize per layer, determining the number of hidden layers to use, determining the size of the hidden layers, etc. Once trained and optimized, merging neural network 330 processes outputs 312 and intermediate layer results 314 from original neural networks 310 to perform and output classifications 340.

It should be noted that while only one intermediate layer from each original neural network 310 is used for merging purposes herein, any number of intermediate layers may be used without deviating from the scope of the invention. Indeed, any subset of intermediate layers may be used, and this need not include last intermediate layer 314.

FIG. 4 is a flowchart 400 illustrating a process for fusing trained AI networks to produce more accurate classifications, according to an embodiment of the present invention. The process begins with training and optimizing parameters of the original neural networks (e.g., DLNNs and SLNNs) at 410. The outputs from the output layer and intermediate layer results from one or more intermediate layers of the original neural networks are then obtained at 420 for all training data. The outputs and intermediate layer results plus the training truth data are then used to train and optimize a merging neural network at 330. Optimization may include, but is not limited to, selecting which layer(s) to merge, determining whether to batch normalize per layer, determining the number of hidden layers to use, determining the size of the hidden layers, etc.

Once trained and optimized, in order to perform classification, the original neural networks run predictions on the new data, and their outputs and intermediate layer results are obtained at 440. The merging neural network then processes these outputs and intermediate layer results from the original neural networks and performs and outputs classifications at 450.

Figure 5:
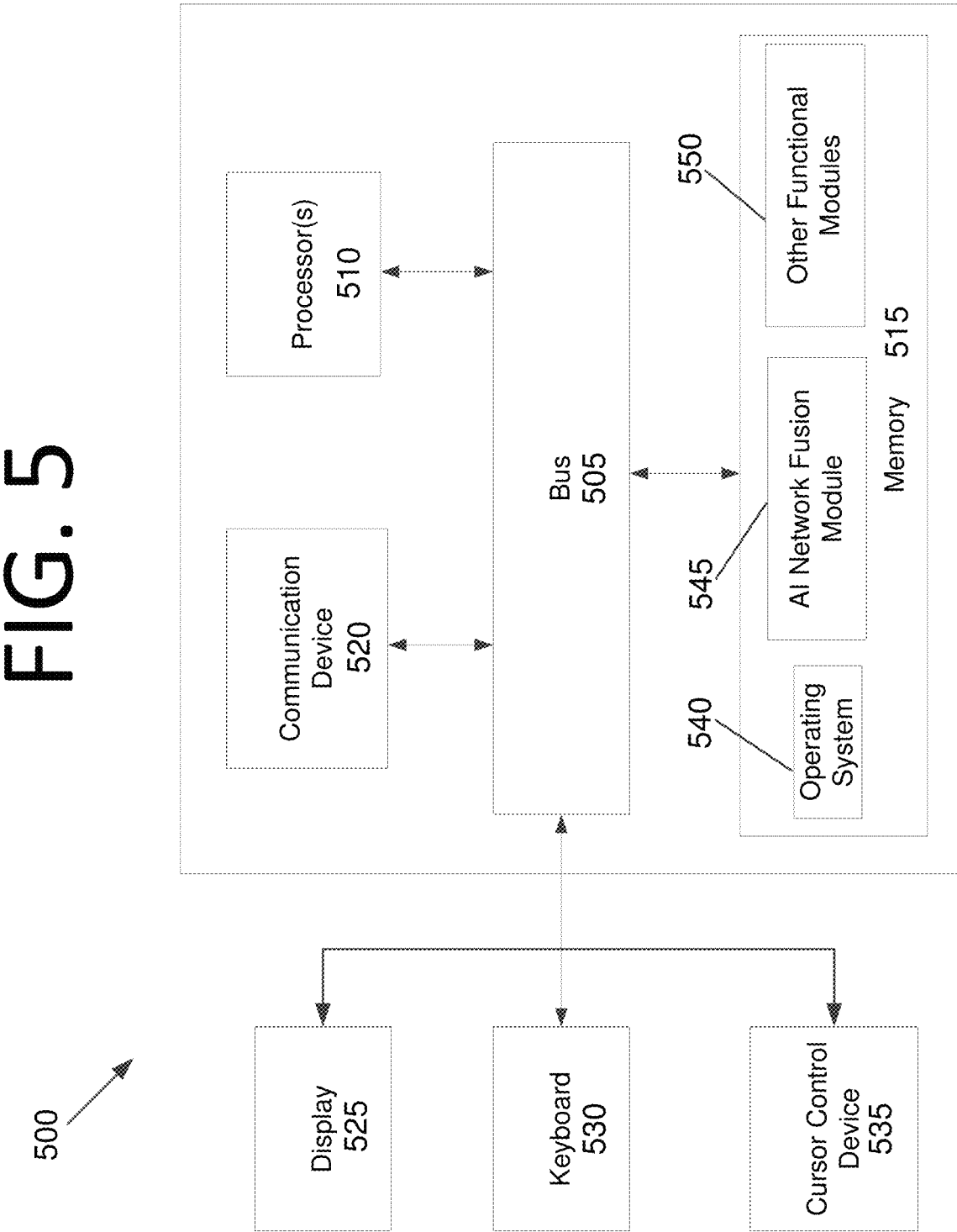
FIG. 5 is a block diagram illustrating a computing system configured to fuse trained AI networks to produce more accurate classifications, according to an embodiment of the present invention.

FIG. 5 is a block diagram illustrating a computing system configured to fuse trained AI networks to produce more accurate classifications, according to an embodiment of the present invention. Computing system 500 includes a bus 505 or other communication mechanism for communicating information, and processor(s) 510 coupled to bus 505 for processing information. Processor(s) 510 may be any type of general or specific purpose processor, including, but not limited to, a central processing unit (CPU), as system on a chip (SoC), and/or an application specific integrated circuit (ASIC). Processor(s) 510 may also have multiple processing cores, and at least some of the cores may be configured to perform specific functions. Multi-parallel processing may be used in some embodiments. Computing system 500 further includes a memory 515 for storing information and instructions to be executed by processor(s) 510. Memory 515 can be comprised of any combination of random access memory (RAM), read only memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, removable media, and/or non-removable media. Additionally, computing system 500 includes a communication device 520, such as a transceiver and antenna, a network card, etc. to wirelessly provide access to a communications network.

Processor(s) 510 are further coupled via bus 505 to a display 525, such as a Liquid Crystal Display (LCD), for displaying information to a user. A keyboard 530 and a cursor control device 535, such as a computer mouse, are further coupled to bus 505 to enable a user to interface with computing system. However, in certain embodiments such as those for mobile computing implementations, a physical keyboard and mouse may not be present, and the user may interact with the device solely through display 525 and/or a touchpad (not shown). Any type and combination of input devices may be used as a matter of design choice.

Memory 515 stores software modules that provide functionality when executed by processor(s) 510. The modules include an operating system 540 for computing system 500. The modules further include an AI network fusion module 545 that is configured to fuse trained AI networks to produce more accurate classifications by employing any of the approaches discussed herein or derivatives thereof. Computing system 500 may include one or more additional functional modules 550 that include additional functionality. In some embodiments, the original DLNNs and SLNNs also run in memory 515 since they generate the inputs that get fused in AI network fusion module 545. Another way to do this without deviating from the scope of the invention is to create a single large network once all of the networks have been optimized.

One skilled in the art will appreciate that a "system" could be embodied as an embedded computing system, a personal computer, a server, a console, a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 4 may be performed by a computer program, encoding instructions for the non-linear adaptive processor to perform at least the process described in FIG. 4, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the process described in FIG. 4, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, and/or any other suitable hardware.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computing system, comprising:
   memory storing computer program instructions for fusing a plurality trained original neural networks and performing classifications; and
   at least one processor configured to execute the computer program instructions, wherein the computing system is configured to:
   receive output layer results and results from at least one hidden layer from each of a plurality of trained original neural networks,
   perform classifications via a merging neural network based on the received output layer results and the results from the at least one hidden layer from each of the plurality of trained original neural networks, and
   output results of the classifications.

2. The computing system of claim 1, wherein the computing system is further configured to:
   receive training truth data used in part to train the plurality of trained original neural networks;
   receive output layer results and results from at least one hidden layer from each of the plurality of trained original neural networks for training data used in part to train the original neural networks; and
   train and optimize the merging neural network using the received training truth data and the received output layer results and results from at least one hidden layer from each of the plurality of trained original neural networks for the training data used in part to train the original neural networks.

3. The computing system of claim 2, wherein the optimization comprises selecting which hidden layer or layers of the trained original neural networks to merge, determining whether to batch normalize per layer, determining a number of hidden layers to use, determining a size of each hidden layer, or any combination thereof.

4. The computing system of claim 1, wherein the at least one hidden layer is a last hidden layer of a respective trained original neural network.

5. The computing system of claim 1, wherein
   an input layer for the merging neural network is connected to a first hidden dense layer of the merging neural network with a rectified linear unit (ReLU) activation function,
   the first hidden dense layer is connected to a second hidden dense layer of the merging neural network with a ReLU activation function, and
   an output layer of the merging neural network comprises a dense layer with a softmax activation function connected to the second hidden layer.

6. The computing system of claim 5, wherein the input layer of the merging neural network comprises a concatenation of the output layers and last hidden layers of all of the original neural networks.

7. The computing system of claim 1, wherein the trained original neural networks comprise at least one shallow learning neural network (SLNN).

8. The computing system of claim 1, wherein the trained original neural networks comprise at least one deep learning neural network (DLNN).

9. The computing system of claim 1, wherein the trained original neural networks comprise one shallow learning neural network (SLNN) and one deep learning neural network (DLNN).

10. The computing system of claim 1, wherein the trained original neural networks comprise at least one shallow learning neural network (SLNN) and at least one deep learning neural network (DLNN).

11. The computing system of claim 10, wherein the results of the output layer and the at least one hidden layer of the at least one SLNN are batch normalized and concatenated to the results of the output layer and the at least one hidden layer of the at least one DLNN.

12. The computing system of claim 10, wherein the output layer and the at least one hidden layer from the at least one SLNN are generated from expert engineered features and the output layer and the at least one hidden layer from the at least one DLNN are generated from raw data.

13. The computing system of claim 12, wherein the expert engineered features comprise noise estimations, Fast Fourier Transforms (FFTs), cross-correlations among known statistics, or any combination thereof.

14. The computing system of claim 1, wherein each trained original neural network has a different architecture, processes different data, or both.

15. The computing system of claim 1, wherein the processing further comprises:
   concatenating the output layer results and the results from the at least one hidden layer from each of the plurality of trained original neural networks into a single flat layer of neurons.

16. The computing system of claim 15, wherein the trained original neural networks comprise at least one shallow learning neural network (SLNN) and output layer results from the at least one SLNN are normalized prior to concatenation.

17. The computing system of claim 1, wherein the merging neural network only uses features from layers of the trained original neural networks rather than starting with raw data or expert engineered features.

18. The computing system of claim 1, wherein the plurality of trained original neural networks comprise a Siamese neural network, a recurrent neural network, or both.

19. The computing system of claim 1, wherein each of the original neural networks is trained independently.

20. A computer program embodied on a non-transitory computer-readable medium, the program configured to cause at least one processor to:
perform classifications based on output layer results and results from at least one hidden layer from each of a plurality of trained original neural networks; and
output results of the classifications.

21. The computer program of claim 20, wherein the program is further configured to cause the at least one processor to:
train and optimize the program using training truth data used in part to train the plurality of trained original neural networks and output layer results and results from at least one hidden layer from each of the plurality of trained original neural networks for training data used in part to train the original neural networks.

22. The computer program of claim 21, wherein the optimization comprises selecting which hidden layer or layers of the trained original neural networks to merge, determining whether to batch normalize per layer, determining a number of hidden layers to use, determining a size of each hidden layer, or any combination thereof.

23. The computer program of claim 20, wherein
an input layer for the merging neural network is connected to a first hidden dense layer of the merging neural network with a rectified linear unit (ReLU) activation function,
the first hidden dense layer is connected to a second hidden dense layer of the merging neural network with a ReLU activation function, and
an output layer of the merging neural network comprises a dense layer with a softmax activation function connected to the second hidden layer.

24. The computer program of claim 20, wherein the input layer of the merging neural network comprises a concatenation of the output layers and last hidden layers of all of the original neural networks.

25. The computer program of claim 20, wherein the trained original neural networks comprise at least one shallow learning neural network (SLNN).

26. The computer program of claim 20, wherein the trained original neural networks comprise at least one deep learning neural network (DLNN).

27. The computer program of claim 20, wherein the trained original neural networks comprise at least one shallow learning neural network (SLNN) and at least one deep learning neural network (DLNN).

28. The computer program of claim 27, wherein the results of the output layer and the at least one hidden layer of the at least one SLNN are batch normalized and concatenated to the results of the output layer and the at least one hidden layer of the at least one DLNN.

29. The computer program of claim 20, wherein each trained original neural network has a different architecture, processes different data, or both.

30. The computer program of claim 20, wherein the processing further comprises:
concatenating the output layer results and the results from the at least one hidden layer from each of the plurality of trained original neural networks into a single flat layer of neurons.

31. The computer program of claim 20, wherein the trained original neural networks comprise at least one shallow learning neural network (SLNN) and output layer results from the at least one SLNN are normalized prior to concatenation.

32. The computer program of claim 20, wherein each of the original neural networks is trained independently.

33. A computer-implemented method, comprising:
receiving, by a computing system, training truth data used in part to train a plurality of trained original neural networks;
receiving, by the computing system, output layer results and results from at least one hidden layer from each of a plurality of trained original neural networks for training data used in part to train the original neural networks;
training and optimizing a merging neural network, by the computing system, using the received training truth data and the received output layer results and results from at least one hidden layer from each of the plurality of trained original neural networks for the training data used in part to train the original neural networks;
receiving, by the computing system, output layer results and results from at least one hidden layer from each of a plurality of trained original neural networks for new data;
performing classifications via the merging neural network, by the computing system, based on the received output layer results and the results from the at least one hidden layer from each of the plurality of trained original neural networks for the new data; and
outputting results of the classification, by the computing system.

34. The computer-implemented method of claim 33, wherein the optimization comprises selecting which hidden layer or layers of the trained original neural networks to merge, determining whether to batch normalize per layer, determining a number of hidden layers to use, determining a size of each hidden layer, or any combination thereof.

35. The computer-implemented method of claim 33, wherein the at least one hidden layer is a last hidden layer of a respective trained original neural network.

36. The computer-implemented method of claim 33, wherein the trained original neural networks comprise at least one shallow learning neural network (SLNN), at least one deep learning neural network (DLNN), or both at least one SLNN and at least one DLNN.

37. The computer-implemented method of claim 33, wherein each of the original neural networks is trained independently.

38. A computer-implemented method, comprising:
performing classifications via a merging neural network, by a computing system, based on output layer results and the results from the at least one hidden layer from each of the plurality of trained original neural networks for new data not used to train the merging neural network or the plurality of trained original neural networks; and
outputting results of the classification, by the computing system.

39. The computer-implemented method of claim 38, further comprising:
training and optimizing the merging neural network, by the computing system, using training truth data used in part to train the plurality of trained original neural networks and output layer results and results from at least one hidden layer from each of the plurality of trained original neural networks for training data used in part to train the original neural networks.

40. The computer-implemented method of claim 39, wherein the optimization comprises selecting which hidden layer or layers of the trained original neural networks to merge, determining whether to batch normalize per layer, determining a number of hidden layers to use, determining a size of each hidden layer, or any combination thereof.

41. The computer-implemented method of claim 38, wherein the at least one hidden layer is a last hidden layer of a respective trained original neural network.

42. The computer-implemented method of claim 38, wherein the trained original neural networks comprise at least one shallow learning neural network (SLNN), at least one deep learning neural network (DLNN), or both at least one SLNN and at least one DLNN.

43. The computer-implemented method of claim 38, wherein the processing further comprises:
concatenating, by the computing system, the output layer results and the results from the at least one hidden layer from each of the plurality of trained original neural networks into a single flat layer of neurons.

\* \* \* \* \*